United States Patent
Kleeberger et al.

(10) Patent No.: US 12,494,896 B2
(45) Date of Patent: Dec. 9, 2025

(54) PROOF-OF-WORK BASED ON BLOCK CIPHER

(71) Applicant: Infineon Technologies AG, Neubiberg (DE)

(72) Inventors: Veit Kleeberger, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 155 days.

(21) Appl. No.: 17/063,040

(22) Filed: Oct. 5, 2020

(65) Prior Publication Data

US 2021/0119776 A1    Apr. 22, 2021

(30) Foreign Application Priority Data

Oct. 21, 2019    (DE) .......................... 102019216203.7

(51) Int. Cl.
*H04L 9/06* (2006.01)
*H04L 9/08* (2006.01)

(52) U.S. Cl.
CPC ............ *H04L 9/0643* (2013.01); *H04L 9/085* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 10,200,196 B1* | 2/2019 | Rodriguez De Castro | G06F 7/588 |
| 10,581,847 B1* | 3/2020 | Sun | H04L 63/083 |
| 11,108,552 B1* | 8/2021 | Gueron | H04L 9/0869 |
| 11,354,629 B1* | 6/2022 | Nelson | H04L 9/0637 |
| 2004/0017913 A1* | 1/2004 | Hawkes | H04L 9/0643 380/37 |
| 2008/0063187 A1* | 3/2008 | Yoshida | H04L 9/0643 380/28 |

(Continued)

FOREIGN PATENT DOCUMENTS

WO    2019122825 A1    6/2019

OTHER PUBLICATIONS

McNevin, Timothy J., et al., "pTCP: A Client Puzzle Protocol for Defending Against Resource Exhaustion Denial of Service Attacks", Technical Report TR-ECE-04-10, Department of Electrical and Computer Engineering, Virginia Tech, Oct. 2004.

(Continued)

*Primary Examiner* — Rupal Dharia
*Assistant Examiner* — Shadi H Kobrosli
(74) *Attorney, Agent, or Firm* — Harrity & Harrity, LLP (57) ABSTRACT

The disclosure creates a method for generating a proof-of-work. In the method, a data block is associated with a nonce. Then, the data block associated with the nonce is encrypted into a tag using a secret key. In a further step it is checked whether the tag meets a predetermined criterion. If the tag does not meet the predetermined criterion, the nonce is varied and the association and encryption are repeated until the check shows that the tag meets the criterion. In addition, the disclosure relates to the implementation of the proof-of-work during the process of authentication, encryption, transmission and reception of a message. In addition, the disclosure relates to a computer program and a device for carrying out the method.

20 Claims, 5 Drawing Sheets

(56) References Cited

U.S. PATENT DOCUMENTS

| | | | | |
|---|---|---|---|---|
| 2010/0299538 A1* | 11/2010 | Miller | .................. | H04L 9/0637 380/28 |
| 2010/0303229 A1* | 12/2010 | Unruh | .................. | H04L 9/0637 380/28 |
| 2011/0191588 A1* | 8/2011 | Rogaway | .............. | H04L 9/3242 713/170 |
| 2011/0249815 A1* | 10/2011 | Robshaw | .............. | H04L 9/0637 380/28 |
| 2013/0148802 A1* | 6/2013 | Taylor | .................. | H04L 9/0662 380/28 |
| 2014/0317407 A1* | 10/2014 | Minematsu | ............. | G06F 21/64 713/170 |
| 2015/0033016 A1* | 1/2015 | Thornton | .............. | H04L 9/0869 713/171 |
| 2016/0086175 A1* | 3/2016 | Finlow-Bates | .... | G06Q 20/4015 705/77 |
| 2018/0139051 A1* | 5/2018 | Ghosh | .................. | H04L 9/3242 |
| 2018/0197172 A1* | 7/2018 | Coburn | ................. | H04L 9/0637 |
| 2018/0240112 A1* | 8/2018 | Castinado | ............. | H04L 9/0643 |
| 2018/0294968 A1* | 10/2018 | Johnson | ................ | H04L 9/3239 |
| 2019/0213462 A1* | 7/2019 | McDonald | .............. | G06F 21/44 |
| 2020/0160286 A1* | 5/2020 | Vukich | .............. | G06Q 20/3827 |
| 2020/0313860 A1* | 10/2020 | Junttila | ................. | H04L 9/0662 |
| 2020/0328874 A1* | 10/2020 | Kang | ...................... | H04L 9/008 |
| 2020/0364817 A1* | 11/2020 | Liu | ....................... | H04L 67/535 |
| 2021/0057002 A1* | 2/2021 | Chen | .................... | H04L 9/3242 |
| 2021/0099312 A1* | 4/2021 | Guo | .................... | G06Q 20/401 |
| 2021/0111889 A1* | 4/2021 | Higley | ................. | H04L 9/0618 |
| 2021/0111900 A1* | 4/2021 | Inokuchi | ............... | H04L 9/3239 |
| 2021/0166221 A1* | 6/2021 | Noh | .................... | G06Q 20/3223 |

OTHER PUBLICATIONS

"Proof of work", Wikipedia, Sep. 30, 2020, https://en.wikipedia.org/wiki/Proof_of_work.

Bruce Schneier, "Angewandte Kryptographie", Addison-Wesley, 1996.

* cited by examiner

PROOF-OF-WORK BASED ON BLOCK CIPHER

FIELD

The present disclosure is directed to a method for proving a proof-of-work (PoW) by means of a block encryption procedure. This disclosure also relates to a method for sending a message and a method for verifying a PoW, such as a PoW for/in a received message or an authentication operation. In addition, the disclosure relates to a computer program and a device for carrying out the method.

BACKGROUND

A proof-of-work, also called "computational puzzle" or "cryptographic puzzle"; or PoW for short, is a method used in computer science that is designed to prevent the excessive use of a service, such as denial-of-service attacks or the bulk sending of e-mails. The idea of proof-of-work is that a service user must first do some work him/herself before being allowed to use the service—a kind of user fee. It was first proposed in 1992 by Cynthia Dwork and Moni Naor to curb the sending of junk mail. There are numerous problems from areas such as cryptology or numerical analysis, the solutions of which are difficult to calculate, but can subsequently be easily checked for correctness. Ideal problems are those for which the effort required to solve them can be influenced by a slight modification of the problem. This means that the effort the user has to apply can be adapted to suit the circumstances, for example the available computing power. One implementation of this method is Hashcash. (See PoW at https://en.wikipedia.org/wiki/Proof_of_Work).

In the method known as Hashcash, a 'nonce' number must be found such that a hash that contains the nonce meets certain requirements. The validator simply calculates the hash and verifies that the pre-defined requirements are met. A hash function, also called a scatter value function, is a mapping that maps a large set of inputs onto a smaller target set, i.e. the hash values. A hash function is therefore generally not one-to-one. The input set can contain elements of different lengths, while the elements of the target set usually have a fixed length.

For the purposes of the invention, a nonce is defined as a preliminary word, sequence of letters or numbers, chosen temporarily with the intention of being replaced under certain circumstances, for example, to denote a combination of numbers or letters which is used only once in the context in question.

Block encryption (also known as block cipher) is a deterministic encryption method in which a plain-text block, i.e. a section of plain text of fixed length, is mapped onto a secret text block or key text block of fixed length. This mapping is controlled by a key. Anyone who knows this key can recreate the plain text from the secret text by computation, with roughly the same effort as for the encryption. Since a block cipher can encrypt only one block of a given length, longer texts are padded to a multiple of the block length and divided into blocks, and an operating mode is selected that specifies how the block cipher should be applied to it.

SUMMARY

It would therefore be desirable to provide a proof-of-work concept which enables a reliable, secure and flexible usage.

The objects outlined above are achieved in accordance with the independent patent claims. The dependent claims represent advantageous embodiments. Further advantageous embodiments can be found in the description and the figures. The general, preferred and particularly preferred embodiments, technical fields, etc. given in connection with the present invention can be combined as desired. Individual definitions, embodiments etc. may also be omitted or not be relevant.

Examples given in this disclosure create a method for generating a proof-of-work that has the following features:
associating a data block with a nonce, encrypting the data block associated with the nonce with a secret key to form a tag,
checking whether the tag meets a predetermined criterion, and if the tag does not meet the predetermined criterion (K), varying the nonce and repeating the association and the encryption until the check shows that the tag meets the criterion.

The PoW concept according to the disclosure allows a number of participants to be limited based on a shared secret key known only to them, who can then participate in the Proof-of-Work. Using this method, the PoW concept according to the disclosure can also form the basis of a private blockchain. For this reason, the PoW concept is also suitable, for example, for vehicle-internal networks in which the number of participants can be limited or should be fixed. In addition, the PoW concept is suitable for combining user authentication, validation of user data, authorization and/or encryption, with negligible additional computing costs. Ultimately, due to the simple combination capacity and scalability of all three modes, namely: PoW, authentication, encryption with data blocks of arbitrary size, a high degree of flexibility can be achieved in the use of the method. To enable block validation, a selected proof-of-work function must be publicly known to all participants. For example, the shared secret key can be deployed during the runtime via an exchange protocol. In other examples, the shared secret key is deployed by a fixed implementation in individual nodes of a network, during its configuration or production. In certain examples, where hardware-based secret shared keys are provided that are intended for use only by the piece of hardware in question, this method can ensure a fixed, pre-defined and known computing power among the subscribers of the limited network. Thus, for example, private block chains, e.g. in the vehicle, can be set up by common usage of the shared secret key for electronic control units in the same vehicle.

In one example, to adjust the degree of difficulty/computational effort required when generating the proof-of-work, the nonce can be varied according to a condition.

According to another example, by specifying the character length of the nonce a degree of difficulty/computational effort involved in generating the proof-of-work can be easily set. The longer the character string selected in the nonce, the more difficult it is to calculate a required string that corresponds to the criterion of a predetermined tag.

In another advantageous example, the nonce has a constant character length.

A constant character length of the nonce is particularly advantageous in connection with the use of a symmetric block encryption method, since only blocks of a predetermined size can be encrypted using the symmetric encryption method.

In particular, in another advantageous example, the data block also has a constant character length, so that in combination with a constant character length of the nonce a fixed size of a block to be encrypted with a symmetric block encryption method can be guaranteed. In this way, in a block encryption, a plain text block, i.e. a section of plain text of fixed length, is mapped onto a secret text block or key text block of fixed length. This also means that, without restriction of generality, depending on the size of the block to be encrypted the text can have the same size as the original, or it can be filled to the required size using specific characters, or transmitted in hashed form.

In yet another example, at least part of the data block of the message comprises a checksum and/or a hash function of at least one additional part of the data block or of the same data block of the message and/or at least a part of at least one data block of an additional message, and/or the entire additional message itself. This can also ensure the integrity and authenticity of the message or a data block within the message. In addition, for example, an integration of a hash value of another message, such as a preceding message, into a subsequent "new" message allows a block chain to be set up.

In an expedient example, the key is a cryptographic secret key for a symmetric method. The advantage of using the symmetric method in this case is that the same secret key can be used to encrypt and decrypt messages, thereby minimizing the control effort required for the encryption or decryption. This encryption method is particularly advantageous and secure when only a limited number of communication participants has knowledge of the secret key.

In one example, the criterion for the tag corresponds to a predetermined pattern of consecutive characters. This also allows the degree of difficulty and/or computational effort in generating the proof-of-work to be controlled. For example, a specific pattern or a specific sequence of characters within the character string of the nonce could be precisely set. Thus, for a nonce with a length of 16 characters, a nonce with three leading zeros would be easier to calculate than a nonce with four or more leading, i.e. prefixed, zeros.

According to a further aspect, a method is provided for sending a message that comprises at least one data block. To this end a tag is generated from a data block of the message and a nonce using the method for generating the proof-of-work described above, and the message is then sent together with the nonce that generates the tag. The sent message already contains the data block that generates the tag. This version of the method can be considered equivalent to an authentication process in which a particular sender, for example a particular person or a device, actively asserts a specific identity.

According to a further aspect, a method is provided for sending a message that comprises at least one data block. To this end, a tag is generated from a data block of the message and a nonce using the method for generating the proof-of-work described above, and the message is then sent together with the tag. The sent message already contains the data block that generates the tag. This version of the method can also be considered equivalent to an authentication.

According to yet another aspect, a method is provided for sending a message that comprises at least one data block. To this end a tag is generated from a data block of the message and a nonce using the method for generating the proof-of-work described above, and the message is then sent together with the tag and the nonce that generates the tag. The sent message already contains the data block that generates the tag. This version of the method can also be interpreted as or equated to authentication.

According to a further aspect, a method is provided for sending a message that comprises a plurality of data blocks. To this end, a tag is generated from each data block in the message and from a nonce that can be assigned to each data block DB, using the method for generating the proof-of-work for each individual data block. The message is then sent together with the tags and/or the nonces that generate the respective tags. The respective tag-generating data blocks are also comprised in the message. According to an example, this aspect of the method also implicitly comprises the possibility that when a symmetric block key is used, this symmetric block key is the same for all encryptions and because of the specific implementation of the proof-of-work, a constant character length for a block or nonce is also specified. This version of the method can also be considered equivalent to authentication for the respective data blocks together with the associated nonces or the respective tags.

Another aspect provides a method for verifying a proof-of-work, in which a message that comprises at least one data block and one nonce is received, wherein the at least one data block and the nonce are decrypted/encrypted into a tag using a predetermined secret key. It is then checked whether the tag meets a predetermined criterion. This version of the method for verifying proof-of-work can be considered equivalent to an authentication in which a particular recipient, such as a specific person or device, actively verifies a specific asserted identity, for example, of one of the above-mentioned senders.

For example, the predetermined criterion may be the same as in the case of one of the authentication methods described above. If in checking the proof-of-work when authenticating or sending a message the same result is obtained as in validating the proof-of-work when receiving a/the message, so that the tag would meet a predetermined criterion, the sending and/or authenticating and receiving and/or authentication of the message could be interpreted as an authorization of the transmission. In other words, an authorization means that after the criterion has been checked, certain rights can be granted or denied, or certain control commands can be triggered.

In another aspect a method for validating a proof-of-work is provided in which a message is received that comprises at least one data block and a tag which was generated by encrypting a nonce associated with the data block with a secret key. It is then checked whether the tag meets a predetermined criterion. For this aspect, the above comments in relation to an authentication and/or authorization process apply.

In yet another aspect a method for validating a proof-of-work is provided, in which a message is received that comprises at least one data block, one tag and one nonce. It is then checked whether the tag meets a predetermined criterion. In addition, it can be checked whether a nonce calculated by decrypting the tag using a secret key matches the nonce that was received with the message. This allows a plausibility check to be inserted into the process, which performs a double validation of the tag and nonce features when authenticating the received message.

In an example of the above methods for sending/authenticating and receiving/authenticating a message according to one of the preceding aspects, the secret key for encrypting/decrypting the tag is a cryptographic secret key for a symmetric method. In some cases, a complex asymmetric cryptography is not necessary, and symmetric encryption is sufficient. This relates to environments where a secure key agreement is possible. Even environments in which a central authority knows and manages all keys, such as in closed banking systems, are suitable for symmetric encryption methods.

According to one aspect, a method is provided for sending a message wherein the message comprises a plurality of data blocks of identical character length. To this end, a tag is generated from a specific data block in the message and a nonce using the method for generating the proof-of-work described above. A first secret text is generated by encrypting the specific data block with the tag. Each additional secret text is generated—depending on the remaining number of data blocks—by encrypting each of the remaining individual data blocks with the tag. The specific data block generating the tag is then sent together with the nonce and the secret texts. This means multiple data blocks of the same size can be easily encrypted with the same tag. When receiving such a message that comprises a tag-generating data block together with the nonce and the secret texts, according to one aspect a/the proof-of-work is verified, wherein the tag-generating data block and the nonce are encrypted/decrypted into a tag by means of a secret key and it is checked whether the tag meets a predetermined criterion. If the tag meets the predetermined criterion, the individual secret texts can be decrypted using the tag to restore the data block generating the tag. In other words, a recipient of the message would generate or verify the tag from the data block and the nonce using the secret key known to both the sender and the recipient, and then decrypt the individual encrypted texts using the tag.

According to another aspect, a method for sending a message is provided, in which the message comprises a plurality of data blocks of identical character length. To this end, a tag is generated from a specific data block in the message and a nonce using the method for generating the proof-of-work described above. A first secret text is generated by encrypting the specific data block with the tag. Further secret texts are generated depending on the remaining number of data blocks by encrypting each of the remaining consecutive data blocks with a respectively associated tag, which is obtained by encrypting the specific data block and a nonce incremented by a specific value with the secret key. The specific data block generating the tag is then sent together with the nonce and the secret texts. The recipient knows the value of the increment—or can transmit it when sending the message.

When receiving such a message that comprises a tag-generating data block together with the nonce and the secret texts, according to one aspect a/the proof-of-work is verified, wherein the tag-generating data block and the nonce are encrypted/decrypted into a tag by means of a secret key and it is checked whether the tag meets a predetermined criterion. If the tag meets the predetermined criterion, the first secret text C1 can be decrypted using the tag to restore the data block generating the tag. In other words, a recipient of the message would generate or verify the tag from the data block and the nonce using the secret key known to both the sender and the recipient, and then decrypt the first encrypted text using the tag. The remaining consecutive individual secret texts are decrypted to restore the data blocks with a respectively associated tag, wherein the associated tag is obtained by encrypting the specific data block generating the tag and a nonce incremented by a certain value, using the secret key. In other words, from the data block that generates the tag and the nonce incremented by a specific value for each encrypted text, and using the secret key known to both the sender and the recipient, a recipient of the message would generate a tag with which the other encrypted texts are successively decrypted.

According to one example, the respective data blocks are encrypted with an associated tag using a bitwise XOR operation. On many computers, bitwise operations are faster than addition and subtraction operations and significantly faster than multiplication and division operations. Thus, the computing power of a processor can be optimally utilized for the encryption.

The objects outlined above are achieved in accordance with the independent patent claims. The dependent claims represent advantageous embodiments. Further advantageous embodiments can be found in the description and the figures. The general, preferred and particularly preferred embodiments, technical fields, etc. given in connection with the present invention can be combined as desired. Individual definitions, embodiments etc., may also be omitted or not be relevant.

BRIEF DESCRIPTION OF THE DRAWINGS

Examples of the disclosure are described with reference to the attached drawings. In the drawings.

DETAILED DESCRIPTION

In the following, examples of the present disclosure are described in detail using the attached descriptions. It should be noted that identical elements or elements that have the same functionality can be labelled with the same or similar reference signs, and a repeated description of elements that are labelled with the same or similar reference signs is typically omitted. Descriptions of elements that have the same or similar reference signs are interchangeable. In the following description, many details are described in order to provide a more in-depth explanation of examples of the disclosure. However, it is obvious to persons skilled in the art that other examples without these specific details can be implemented. Features of the different examples described can be combined with one another, unless the features of a corresponding combination mutually exclude each other or such a combination is explicitly excluded.

Figure 1:
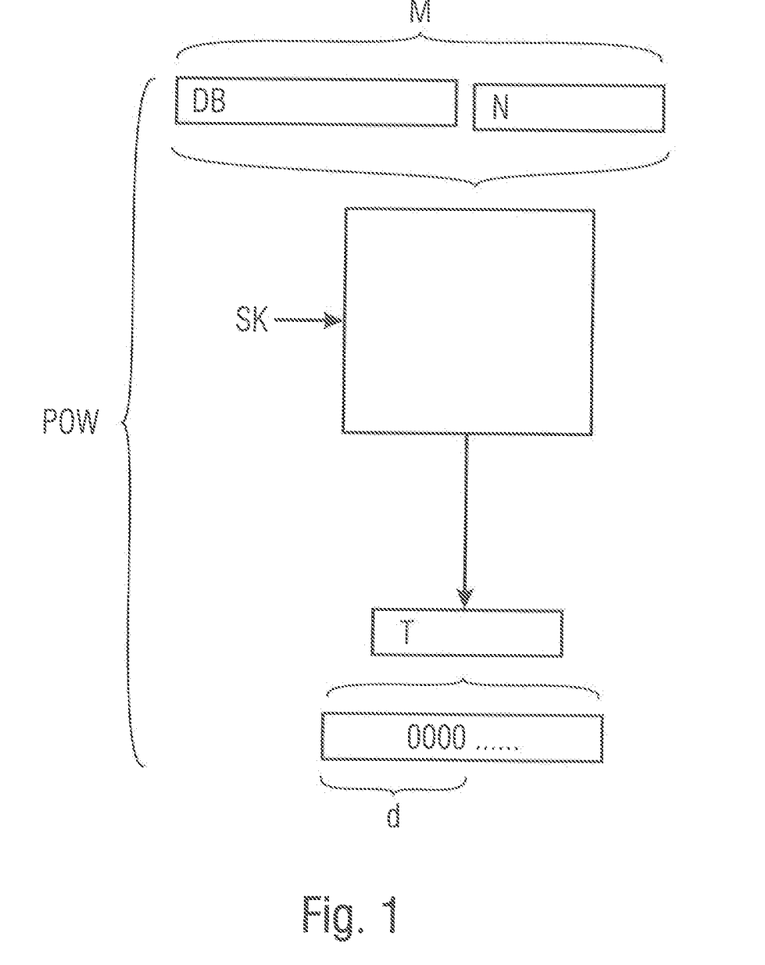
FIG. 1 shows a block diagram for the simplified illustration of a proof-of-work according to the disclosure.

FIG. 1 shows a block diagram as a simplified illustration of a proof-of-work PoW according to the disclosure. For example, such a method for proving a proof-of-work PoW can be implemented when sending a message M. The proof-of-work PoW therefore has the function of providing proof of a completed piece of work and of authenticating the message M, which has provided proof of such an amount of work being completed. To generate the proof-of-work PoW, a data block DB is associated with a nonce N and then encrypted so that a tag T is generated that meets a predetermined criterion K. The tag T has a predetermined character length, wherein a criterion K of the tag T can have a predetermined character pattern, for example. In the present case of FIG. 1, the T tag has a sequence of characters, the criterion of which is to have four leading zeros in the string of the predetermined character length of the tag T. For example, a degree of difficulty d to determine a matching tag T from a data block DB with an associated nonce N, which are encrypted with each other, can be controlled by the length of the character string of the tag T, where a longer string also represents a higher degree of difficulty d. In addition, by specifying the pattern of the tag T to be satisfied—for example, four leading zeros—the degree of difficulty d can also be controlled.

According to one example, the data block DB has a fixed predetermined block size and the nonce N associated with it also has a fixed character length. When determining the tag T, the data block DB remains unchanged and is associated with a nonce N, which is varied according to a predetermined condition, until the association between the data block DB and the respective variable nonce N, encrypted by means of the secret key SK, results in the tag T that meets the desired criterion K—here four leading zeros. According to an example, a condition to vary the nonce N can be a random algorithm, an incrementing algorithm, and so on. According to an example, the secret key SK for encrypting the data block DB with the nonce N corresponds to a block key. In another example, the tag T is obtained using a symmetrical encryption method, wherein the secret key SK, which is a block key, encrypts the association between data block DB and nonce N.

Figure 2:
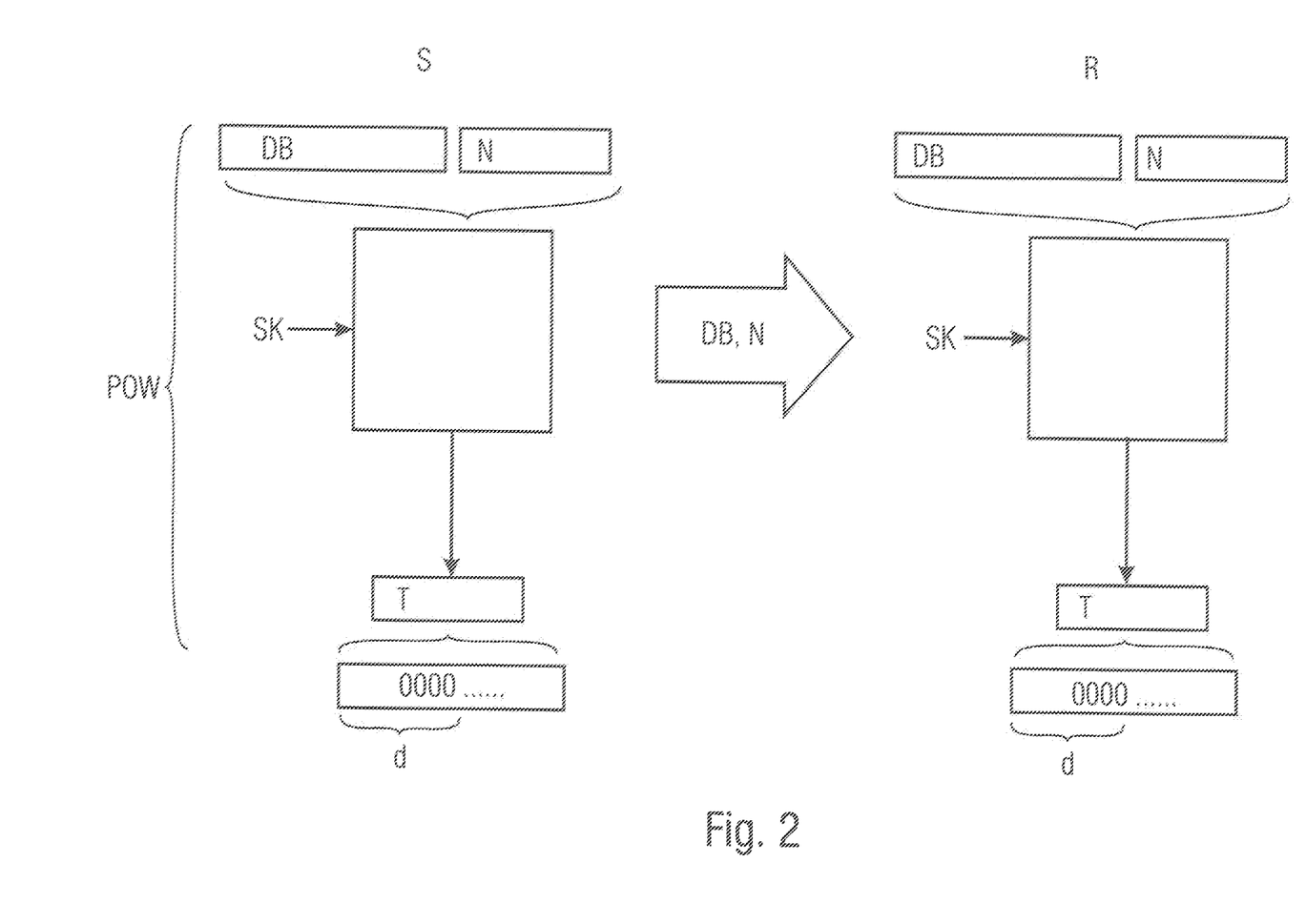
FIG. 2 shows a block diagram for the simplified illustration of a transmission between a sender and a recipient of a message, incorporating the proof-of-work according to the disclosure in FIG. 1.

FIG. 2 illustrates the use of the proof-of-work PoW in a transmission between a sender S and a receiver R (recipient) in a simplified form, without explicit transmission of a message M. For example, the process illustrated in FIG. 2 may also correspond to a user authentication or user data validation process. In this case, a sender S is authenticated by demonstrating a proof-of-work PoW, as described in the examples in FIG. 1, by providing a recipient R with the data block DB and the associated nonce N, the association of which was encrypted into a tag T using the secret key SK, so that the tag T satisfies a required criterion K—four leading zeros. In order to meet the criterion K, the sender S had to calculate a tag T by varying the nonce N due to the required degree of difficulty d. In order to authenticate the sender S, the recipient R must encrypt an association of the received data block DB with the received nonce N using only the same secret key SK known to it, in order to calculate the desired tag T and then verify it against the desired criterion K. If the tag T satisfies the predetermined criterion K, the recipient R will authenticate the sender S.

The method according to FIG. 2 only represents the proof of the proof-of-work PoW wherein a transmission between sender S and recipient R can comprise a message M, which itself can comprise multiple data blocks DB1, . . . , DBN. The authentication of the recipient R can in turn trigger an authorization of further steps not explicitly indicated here.

In another example, not illustrated here, messages M, the block size of which exceeds a predetermined fixed block size of the data block DB associated with a nonce N, can be divided into further data blocks DB1, . . . , DBN of the same size in the manner described in FIG. 1 or 2, which are associated with equal-sized nonces N1, . . . , NN, in order to be subsequently encrypted with the secret key SK for sending or authentication according to the method described in FIG. 1 so that they correspond to a tag T1, . . . , TN with a predetermined criterion K. Data blocks DB1, . . . , DBN, the size of which cannot correspond to the predetermined block size, can be padded, for example, with spaces or a predetermined character string.

Figure 3:
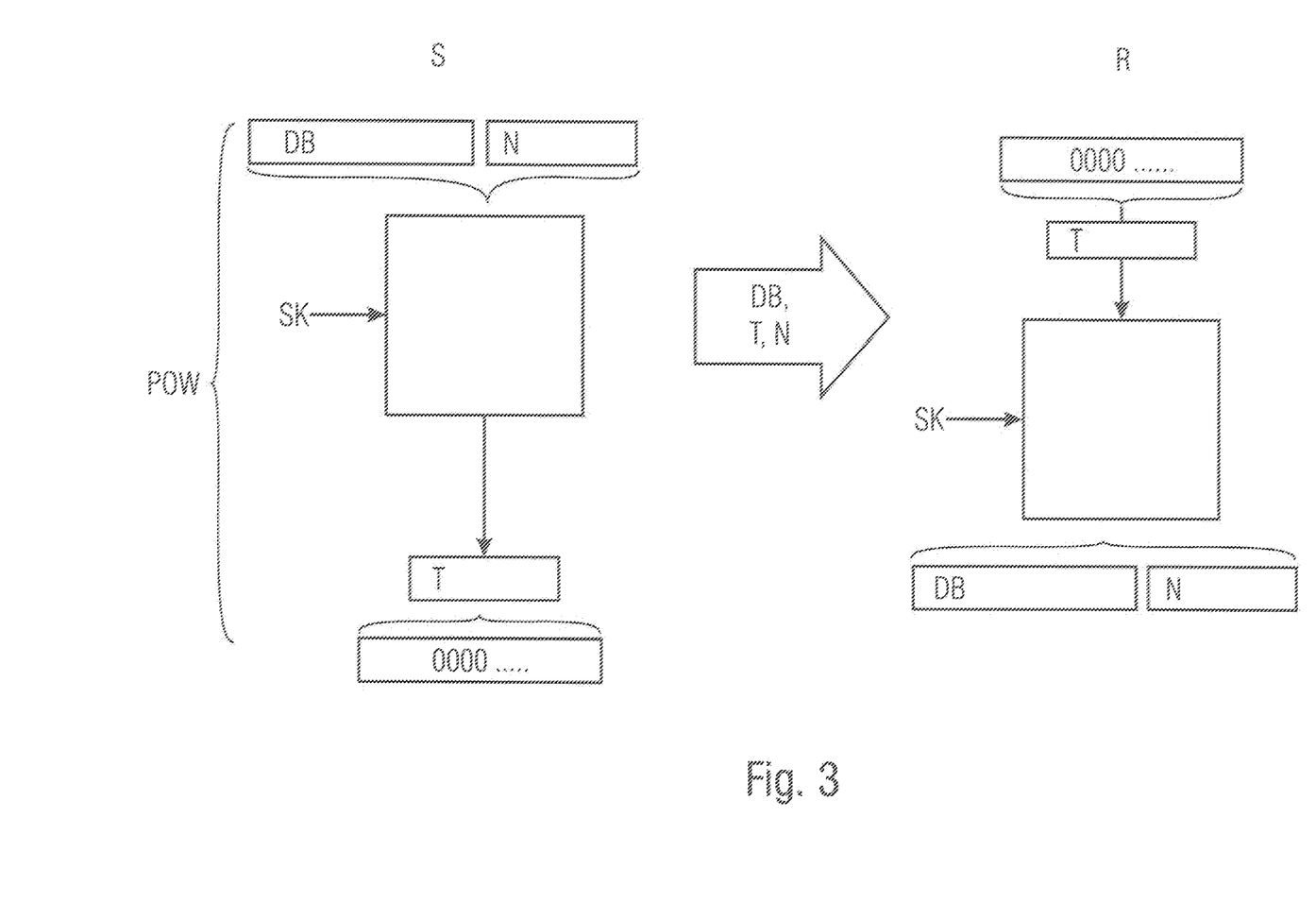
FIG. 3 shows a block diagram for the simplified illustration of a transmission or authentication between a sender and a recipient of a message, incorporating the proof-of-work according to an example of the disclosure.

FIG. 3 shows a block diagram for the simplified illustration of a transmission or authentication between a sender S and a recipient R of a message, incorporating the proof-of-work PoW according to an example of the disclosure. In this case, the example essentially corresponds to the embodiment according to FIG. 2, wherein in addition to the data block DB generating the tag T and/or the associated nonce N, the tag T, which was generated using symmetric block encryption using the secret key SK and corresponds to a predetermined criterion K—four leading zeros—is transmitted to the recipient R.

According to a first variant of the example, the recipient R can verify or authenticate the criterion K—four leading zeros—of the received tag T and then decrypt the received tag T using the secret key SK known to it, for example by means of a symmetric block encryption, the data block DB transmitted by the sender S and the associated nonce N being obtained in plain text. In the example of the first variant, it is not essential to transmit the nonce N to authenticate the message M received from the sender S.

In a second variant of the example, the nonce N is transmitted together with the data block DB and the tag T from the sender S to the recipient R so that the recipient R obtains the data block DB as well as the nonce N in plain text after decoding the tag T by means of the secret key SK known to it by using a symmetric block encryption, wherein in a further step the recipient can compare the nonce N obtained from the encryption using the symmetric block key with the nonce N transmitted by the sender S. The second variant of the example provides a higher level of security compared to the first variant of the example, wherein the verification of the nonce N received or obtained from the encryption can be additionally validated for plausibility or security reasons.

Figure 4:
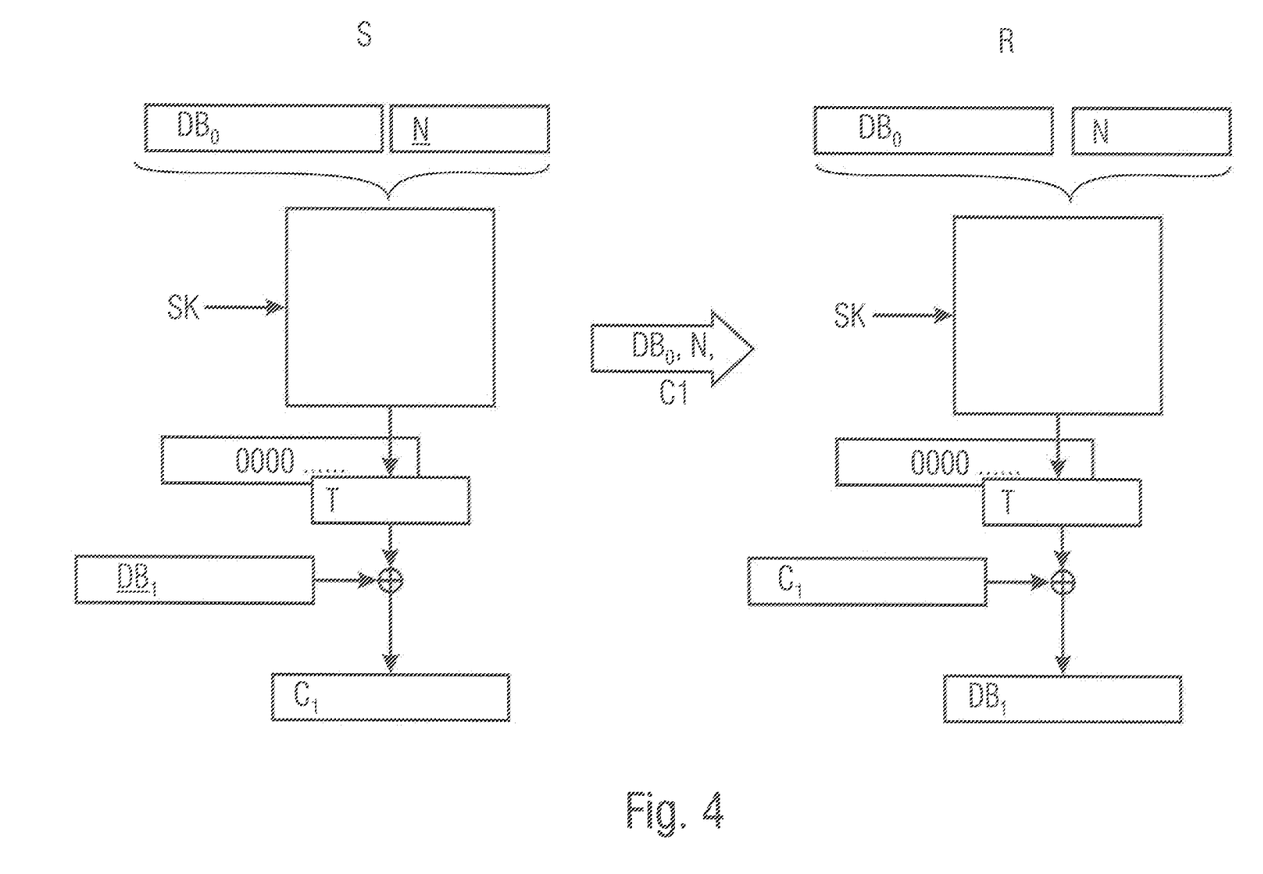
FIG. 4 shows a block diagram for the simplified illustration of a transmission of a plurality of encrypted data blocks according to an example of the disclosure.

FIG. 4 shows a block diagram for a simplified illustration of a transmission of a message M that comprises multiple data blocks DB0, . . . , DBN, according to an example of the disclosure in which specific data blocks DB1, . . . , DBN can be encrypted. To simplify matters, in FIG. 4 the method is illustrated for two different data blocks DB0 and DB1. In a first step, a proof-of-work PoW is performed according to the method in FIG. 1, wherein using the data block DB0 and an associated nonce N, a tag T is calculated which satisfies a predetermined criterion K—four leading zeros. The calculated tag T is used in a further step to encrypt the additional data block DB1 to form an encrypted secret text C1. In the example shown in FIG. 4, the encryption corresponds to an application of a bitwise XOR operation between tag T and the data block DB1. The sender S sends/transmits a message M, which comprises the data block DB0, the associated nonce N and the encrypted secret text C1, to a recipient R. Based on the received data block DB0 and the associated nonce N, the recipient R uses the secret key SK known to it to decrypt the tag T, which must satisfy the predetermined criterion K so that the recipient can authenticate the message sent by the sender S. In this example of FIG. 4, the data block DB0 and the nonce N are encrypted using a symmetric block key SK, which is known to both the sender and the recipient. If the tag T computed or verified by the recipient R meets the criterion K, the message M is authenticated and in a further step, the secret text C1 can be decrypted again using the computed tag T, so that the plain text of the data block DB1 is obtained. The decryption is performed once again by a bitwise XOR operation between the computed tag T and the secret text C1. In another example, the message comprises multiple data blocks DB1, . . . , DBN, wherein the remaining data blocks DB2, . . . , DBN, in a similar method to that described above for the data block DB1, are each encrypted by a bitwise XOR operation of the individual data blocks DB2, . . . , DBN with the tag T to form the respective secret texts C2, . . . , CN. A similar process takes place on the part of the recipient R, in which after the tag T has been computed and the message M authenticated the other secret texts C2, . . . , CN are each decrypted by a bitwise XOR operation with the calculated tag T to form the data blocks DB2, . . . , DBN in plain text.

Figure 5:
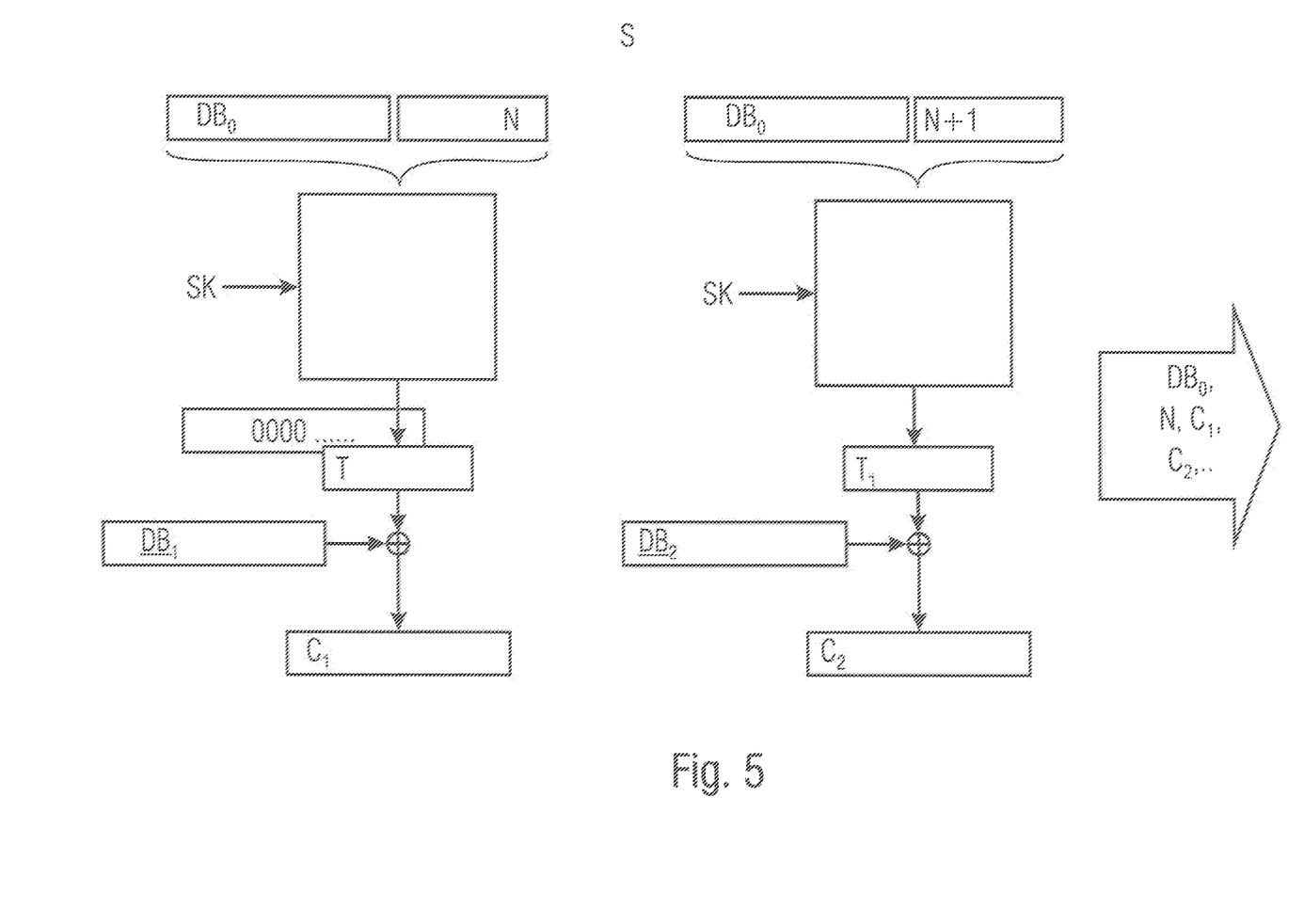
FIG. 5 shows a block diagram for the simplified illustration of a transmission operation of a plurality of encrypted data blocks, according to an example of the disclosure.

FIG. 5 also shows a simplified illustration of a transmission of a message M comprising multiple data blocks DB0, . . . , DBN, according to an example of the disclosure in which specific data blocks DB1, . . . , DBN can be encrypted. To simplify matters, in FIG. 5 the method is illustrated for three different data blocks DB0, DB1 and DB2. In a first step, a proof-of-work PoW is performed according to the method in FIG. 1, wherein using the data block DB0 and an associated nonce N, a tag T is calculated which satisfies a predetermined criterion K—four leading zeros. The calculated tag T is used in a further step to encrypt the additional data block DB1 to form an encrypted secret text C1. In the example shown in FIG. 5, the encryption corresponds to an application of a bitwise XOR operation between the tag T and the data block DB1.

The second data block DB2 is encrypted into a secret text C2, wherein the bitwise XOR operation with the data block DB2 uses a tag T1 which is obtained by encrypting the data block DB0 with an original nonce N incremented by a predetermined value, which now corresponds to the nonce N1 and was generated using the same secret symmetric block key SK. For each additional data block DB3, . . . , DBN, a corresponding tag T2, . . . , TN is formed using the data block DB0 and a preceding nonce N1, . . . , N(N−1), incremented by the same or another predetermined value, which were encrypted using the known secret block key SK. In other words, the respective tag T2, . . . , TN is generated in a counter mode of the original nonce N, wherein the other nonces N1, N2, . . . , NN are generated by successively incrementing the original nonce N.

From the message M encrypted by the sender S in the counter mode of the nonce N with multiple data blocks DB0, . . . , DBN, only the data block DB0, the nonce N and the individual secret texts C1, C2, . . . , CN are sent/transmitted to a potential recipient R for authentication or decryption.

A recipient R can receive the message M, encrypted and sent according to FIG. 5, wherein by means of the data block DB0 and the nonce N by proof of the proof-of-work PoW by forming the tag T, which satisfies the desired criterion K (four leading zeros), it can authenticate the message and then use the received data block DB0 and the nonce N to convert the other encrypted secret texts C2, . . . , CN into plain text by successively incrementing the nonce N with a predetermined value, calculating the tag T2, . . . , TN matching the respective encrypted secret text C2, . . . , CN, and converting the associated data blocks into plain text by means of a bitwise XOR operation. The decryption process is not shown in the figures.

The method described above for proving a proof-of-work PoW is particularly advantageous compared to known methods, because it is easy to implement and therefore flexible to use. In addition, the method is secure and reliable.

Additional embodiments are provided below:

1. A method for generating a proof-of-work, the method comprising:
 associating a data block with a nonce;
 generating a tag by encrypting the data block associated with the nonce using a secret key into the tag; and
 checking whether the tag meets a predetermined criterion, including, if the tag does not meet the predetermined criterion, varying the nonce and repeating a further iteration of the associating, the generating, and the checking with the varied nonce until the checking shows that the tag meets the criterion.

2. The method of embodiment 1, wherein the nonce is varied according to a condition.

3. The method of embodiment 1, wherein the nonce has a constant character length.

4. The method as of embodiment 1, wherein the data block has a constant character length.

5. The method of embodiment 1, wherein the data block is a data block of a message, and wherein at least part of the data block of the message comprises a checksum and/or a hash function of at least one additional part of at least one additional data block or of the same data block of the message and/or of at least a part of at least one data block of an additional message and/or of the entire additional message.

6. The method of embodiment 1, wherein the secret key is a cryptographic secret key for a symmetric method.

7. The method of embodiment 1, wherein the predetermined criterion of the tag corresponds to a predetermined pattern of consecutive characters.

8. A method for sending a message that comprises at least one data block, the method comprising:
 generating a tag from a data block of the message and a nonce, comprising: associating the data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion; and
 sending the message together with the nonce that generates the tag that meets the predetermined criterion.

9. A method for sending a message that comprises at least one data block, the method comprising:
 generating a tag from a data block of the message) and a nonce, comprising: associating the data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion; and
 sending the message together with the tag that meets the predetermined criterion.

10. A method for sending a message that comprises at least one data block, the method comprising:
 generating a tag from a data block of the message and a nonce, comprising: associating the data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion; and sending the message together with the tag and the nonce that generates the tag that meets the predetermined criterion.

11. A method for sending a message, wherein the message comprises a plurality of data blocks, the method comprising:
generating a tags from the plurality of data blocks, including a tag from one data block of the message for each respective data block and a nonce that is assigned to each respective data block wherein assigning each nonce comprises: associating a data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion; and
sending the message together with the tags and/or the nonces generating the respective tags and/or with the data blocks generating the respective tags.

12. A method for validating a proof-of-work, the method comprising:
receiving a message that comprises at least one data block and one nonce;
encrypting the at least one data block and the nonce by means of a secret key into a tag; and
checking whether the tag meets a predetermined criterion.

13. A method for validating a proof-of-work, the method comprising:
receiving a message comprising at least one data block and one tag that was generated by encrypting a nonce associated with the data block using a secret key; and
checking whether the tag meets a predetermined criterion.

14. A method for validating a proof-of-work, the method comprising:
receiving a message that comprises at least one data block, a tag, and a first nonce;
checking whether the tag meets a predetermined criterion; and
checking whether a second nonce, which is calculated by decrypting the tag using a secret key, matches the first nonce received with the message.

15. The method of embodiment 14, wherein the secret key for decrypting the tag is a cryptographic secret key for a symmetric method.

16. A method for sending a message, wherein the message comprises a plurality of data blocks of equal character length, the method comprising:
generating a tag from a specific data block of the message and a nonce, comprising: associating a data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion;
generating a first secret text by encrypting the specific data block with the tag;
generating further secret texts depending on a remaining number of data blocks by encrypting in each case the individual remaining data blocks with the tag; and
sending the specific data block used for generating the tag together with the nonce and the secret texts.

17. A method for validating a proof-of-work (PoW), the method comprising:
receiving a message sent comprising a data block, a nonce, and at least one secret text;
encrypting the data block and the nonce by means of a secret key into a tag;
checking whether the tag meets a predetermined criterion; and
if the tag meets the predetermined criterion decrypting individual secret texts using the tag to restore the data block.

18. A method for sending a message, wherein the message comprises a plurality of data blocks of equal character length, the method comprising:
generating a tag from a specific data block of the message and a nonce, comprising: associating a data block with a nonce; generating a tag by encrypting the data block associated with the nonce using a secret key into the tag; and checking whether the tag meets a predetermined criterion, including, if the tag does not meet the predetermined criterion, varying the nonce and repeating a further iteration of the associating, the generating, and the checking with the varied nonce until the checking shows that the tag meets the criterion;
generating a first secret text by encrypting the specific data block with the tag;
generating further secret texts depending on the remaining number of data blocks by encrypting the respective remaining individual data blocks with a respectively corresponding tag, which is obtained by encrypting the specific data block and a nonce incremented by a specific value with the secret key; and
sending the specific data block generating the tag together with the nonce and the secret texts.

19. A method for validating a proof-of-work, the method comprising:
receiving a message comprising a data block, a nonce, and at least one secret text;
encrypting the data block and the nonce by means of a secret key into a tag;
checking whether the tag meets a predetermined criterion; and
if the tag meets the predetermined criterion: decrypting the secret text using the tag to restore the data block; and decrypting each remaining individual consecutive secret texts to restore further data blocks with a respectively associated tag, which is obtained by encrypting the specific data block and a nonce incremented by a specific value with the secret key.

20. The method of embodiment 16, wherein respective data blocks are encrypted with an associated tag by means of a bitwise XOR operation.

21. A non-transitory computer-readable medium comprising a computer program comprising commands which, during the execution of the computer program by a computer, cause the computer to carry out the method in any one of the preceding embodiments 1 to 20.

22. A device, which is configured to carry out the method in any one of embodiments 1 to 20 or the computer program of embodiment 21.

Another aspect of the disclosure relates to a computer program that comprises commands which, when the computer program is executed by a computer, cause the latter to carry out the method according to one of the preceding examples. A computer program can be easily implemented for/in different applications or devices and adapted to the needs of the user with regard to security and processing time/degree of difficulty.

A further aspect of the disclosure relates to a device that is configured to carry out the method according to any one of the preceding examples, or to execute a computer program according to the preceding example. This can be, for example, an ASIC or a programmable chip or computer. Using a chip specially adapted to the method or computer program, the use of the above described method can be applied and implemented particularly efficiently.

Although some aspects have been described in connection with a device, it goes without saying that these aspects also represent a description of the corresponding method, so that a block or a component of a device is also to be understood as a corresponding method step or as a feature of a method step. Similarly, aspects that have been described in relation to or as a method step also represent a description of a corresponding block or detail or feature of a corresponding device.

Depending on the specific implementation requirements, exemplary embodiments of the invention can be implemented either in hardware or in software. The implementation can be carried out by using a digital storage medium, such as a floppy disk, a DVD, a Blu-Ray disc, a CD, a ROM, a PROM, or an EPROM, EEPROM or Flash memory, a hard disk or other magnetic or optical storage, on which electronically readable control signals are stored, which can interact with a programmable hardware component or interact in such a way that the respective method is carried out. Therefore, the digital storage medium can be computer-readable. Some exemplary embodiments according to the invention thus comprise a data carrier, which has electronically readable control signals that are capable of interacting with a programmable computer system in such a way that one of the methods described herein is carried out.

In general, exemplary embodiments of the present invention may be implemented as a computer program product with a program code, wherein the effect of the program code is to carry out one of the methods when the computer program product is executed on a computer. For example, the program code can also be stored on a machine-readable medium.

Other exemplary embodiments comprise the computer program for carrying out any of the methods described herein, the computer program being stored on a machine-readable medium.

In other words, one exemplary embodiment of the invention is therefore a computer program that has program code for carrying out one of the methods described herein when the computer program is running on a computer. Another exemplary embodiment of the method according to the invention is therefore a data carrier (or a digital storage medium or a computer-readable medium), on which the program for carrying out one of the methods described herein is recorded.

Another exemplary embodiment of the method according to the invention is therefore a data stream or a sequence of signals, which represent or represents the program for carrying out one of the methods described herein. The data stream or the sequence of signals can be configured, for example, so as to be transferred over a data communication connection, for example via the internet.

Another exemplary embodiment comprises a processing device, such as a computer or a programmable logic device, which is configured or adapted to carry out any of the methods described herein.

Another exemplary embodiment comprises a computer on which the computer program for carrying out any of the methods described herein is installed.

In some exemplary embodiments, a programmable logic device (such as a field programmable gate array, an FPGA) can be used to perform some or all of the functions of the methods described herein. In some exemplary embodiments, a field-programmable gate array can interact with a microprocessor to carry out any of the methods described herein. In general, the methods in some exemplary embodiments are carried out by any hardware device. This can be a universally applicable hardware such as a computer processor (CPU) or hardware specific to the method, such as an ASIC.

The above examples are only representative of the principles of the present disclosure. It is important to understand that modifications and variations of the arrangements and details that are described are obvious to persons skilled in the art. It is therefore intended that the disclosure is limited only by the attached claims and not by the specific details that are set out for the purpose of the description and explanation of the examples.

LIST OF REFERENCE SIGNS

S sender
R receiver (recipient)
M message
PoW Proof-of-Work
T tag
N nonce
SK secret key
Du d degree of difficulty
DB data block
DB0 . . . DBN data blocks
C1, . . . , CN encrypted data blocks

What is claimed is:

1. A method for generating a proof-of-work, the method comprising:
associating a first data block of a message with a first nonce,
    wherein the first data block of the message includes a hash value determined based on a preceding message;
generating a first tag by encrypting the first data block associated with the first nonce using a secret key into the first tag;
checking whether the first tag meets a predetermined criterion, including, if the first tag does not meet the predetermined criterion, varying the first nonce by incrementing the first nonce by a specific value and repeating a further iteration of the associating, the generating, and the checking with the varied first nonce until the checking shows that the first tag meets the predetermined criterion, wherein the predetermined criterion of the first tag corresponds to a predetermined pattern of consecutive characters;
encrypting a second data block of the message using the first tag;
incrementing the first nonce by a first value to generate a second nonce,
    wherein a character length of the second nonce is the same as a character length of the first nonce;
encrypting the first data block associated with the second nonce using a symmetric block encryption method and the secret key to generate a second tag;
encrypting a third data block of the message using the second tag; and transmitting the message, including the encrypted first data block, the encrypted second data block, and the encrypted third data block, to a device to which the message is intended.

2. The method of claim 1, wherein the first nonce is varied according to a condition, the method further comprising:
incrementing the second nonce by a second value to generate a third nonce;
generating a third tag by encrypting the first data block of the message associated with the third nonce using the secret key into the third tag; and
encrypting a fourth data block of the message using the third tag.

3. The method of claim 2, wherein a character length of the third nonce is the same as the character length of the first nonce.

4. The method as of claim 1, wherein a character length of the first data block of the message, a character length of the second data block of the message, and a character length of the third data block of the message comprise a same character length.

5. The method of claim 1, wherein at least part of the first data block of the message comprises a checksum and a hash function of at least a part of at least one data block of the preceding message.

6. The method of claim 1, wherein the secret key is a cryptographic secret key for a symmetric method.

7. A method for sending a message that comprises at least one data block, the method comprising:
generating a first tag from a first data block of the message and a first nonce, wherein the first data block of the message includes a hash value determined based on a preceding message, and wherein generating the first tag comprises:
associating the first data block of the message with the first nonce;
generating the first tag by encrypting the first data block of the message associated with the first nonce using a secret key into the first tag; and
checking whether the first tag meets a predetermined criterion, including, if the first tag does not meet the predetermined criterion, varying the first nonce by incrementing the first nonce by a specific value and repeating a further iteration of the associating, the generating, and the checking with the varied first nonce until the checking shows that the first tag meets the predetermined criterion, wherein the predetermined criterion of the first tag corresponds to a predetermined pattern of consecutive characters;
encrypting a second data block of the message using the first tag;
incrementing the first nonce by a first value to generate a second nonce,
wherein a character length of the second nonce is the same as a character length of the first nonce;
encrypting the first data block of the message associated with the second nonce using a symmetric block encryption method and the secret key to generate a second tag;
encrypting a third data block of the message using the second tag; and
sending the message, including the encrypted first data block, the encrypted second data block, and the encrypted third data block, together with the first nonce that generates the first tag that meets the predetermined criterion.

8. A method for sending a message that comprises a plurality of data blocks, the method comprising:
generating a first tag from a first data block of the message and a first nonce, wherein the first data block of the message includes a hash value determined based on a preceding message, and wherein generating the first tag comprises:
associating the first data block of the message with the first nonce;
generating the first tag by encrypting the first data block of the message associated with the first nonce using a secret key into the first tag;
checking whether the first tag meets a predetermined criterion, including, if the first tag does not meet the predetermined criterion, varying the first nonce by incrementing the first nonce by a specific value and repeating a further iteration of the associating, the generating, and the checking with the varied first nonce until the checking shows that the first tag meets the predetermined criterion, wherein the predetermined criterion of the first tag corresponds to a predetermined pattern of consecutive characters;
encrypting a second data block of the message using the first tag;
incrementing the first nonce by a first value to generate a second nonce,
wherein a character length of the second nonce is the same as a character length of the first nonce;
encrypting the first data block of the message associated with the second nonce using a symmetric block encryption method and the secret key to generate a second tag; and
encrypting a third data block of the message using the second tag; and
sending the message, including the encrypted first data block, the encrypted second data block, and the encrypted third data block, together with the first tag that meets the predetermined criterion.

9. A method for sending a message that comprises a plurality of data blocks, the method comprising:
generating a first tag from a first data block of the message and a first nonce, wherein the first data block of the message includes a hash value determined based on a preceding message, and wherein generating the first tag comprises:
associating the first data block of the message with the first nonce;
generating the first tag by encrypting the first data block of the message associated with the first nonce using a secret key into the first tag;
checking whether the first tag meets a predetermined criterion, including, if the first tag does not meet the predetermined criterion, varying the first nonce by incrementing the first nonce by a specific value and repeating a further iteration of the associating, the generating, and the checking with the varied first nonce until the checking shows that the first tag meets the predetermined criterion, wherein the predetermined criterion of the first tag corresponds to a predetermined pattern of consecutive characters;
encrypting a second data block of the message using the first tag;
incrementing the first nonce by a first value to generate a second nonce,
wherein a character length of the second nonce is the same as a character length of the first nonce;

encrypting the first data block of the message associated with the second nonce using a symmetric block encryption method and the secret key to generate a second tag; and encrypting a third data block of the message using the second tag; and sending the message, including the encrypted first data block, the encrypted second data block, and the encrypted third data block, together with the first tag and the first nonce that generates the first tag that meets the predetermined criterion.

10. A method for sending a message, wherein the message comprises a plurality of data blocks, the method comprising:

generating tags from the plurality of data blocks of the message, including a tag from one data block of the message for each respective data block and a nonce that is assigned to each respective data block, wherein the one data block of the message includes a hash value determined based on a preceding message, and wherein assigning each nonce comprises:

associating the one data block of the message with a first nonce;

generating a first tag by encrypting the one data block of the message associated with the first nonce using a secret key into the first tag;

checking whether the first tag meets a predetermined criterion, including, if the first tag does not meet the predetermined criterion, varying the first nonce by incrementing the first nonce by a specific value and repeating a further iteration of the associating, the generating, and the checking with the varied first nonce until the checking shows that the first tag meets the predetermined criterion, wherein the predetermined criterion of the first tag corresponds to a predetermined pattern of consecutive characters;

encrypting a second data block of the message using the first tag;

incrementing the first nonce by a first value to generate a second nonce, wherein a character length of the second nonce is the same as a character length of the first nonce;

encrypting the one data block of the message associated with the second nonce using a symmetric block encryption method and the secret key to generate a second tag; and encrypting a third data block of the message using the second tag; and sending the message, including the encrypted one data block, the encrypted second data block, and the encrypted third data block, together with the tags, the nonces generating the respective tags, and the data blocks generating the respective tags.

11. A method for sending a message, wherein the message comprises a plurality of data blocks of equal character length, the method comprising:

generating a tag from a specific data block of the message and a nonce, wherein the specific data block of the message includes a hash value determined based on a preceding message, and wherein generating the tag comprises:

associating the specific data block of the message with the nonce;

generating the tag by encrypting the specific data block of the message associated with the nonce using a secret key into the tag; and checking whether the tag meets a predetermined criterion, including, if the tag does not meet the predetermined criterion, varying the nonce by incrementing the nonce by a specific value and repeating a further iteration of the associating, the generating, and the checking with the varied nonce until the checking shows that the tag meets the predetermined criterion, wherein the predetermined criterion of the tag corresponds to a predetermined pattern of consecutive characters;

generating a first secret text by encrypting the specific data block of the message with the tag;

generating further secret texts depending on a remaining number of data blocks of the message by encrypting individual remaining data blocks of the message with respective tags generated by encrypting the specific data block associated with an incremented nonce using a symmetric block encryption method and the secret key, wherein the incremented nonce comprises the nonce incremented by the specific value for each of the remaining number of data blocks of the message; and sending the message, including the encrypted data blocks, and the specific data block of the message used for generating the tag together with the nonce and the secret texts.

12. The method of claim 11, wherein respective data blocks of the message are encrypted with an associated tag by means of a bitwise XOR operation.

13. A method for sending a message, wherein the message comprises a plurality of data blocks of equal character length, the method comprising:

generating a tag from a specific data block of the message and a nonce, wherein the specific data block of the message includes a hash value determined based on a preceding message, and wherein generating the tag comprises:

associating the data block of the message with the nonce;

generating the tag by encrypting the data block of the message associated with the nonce using a secret key into the tag;

checking whether the tag meets a predetermined criterion, including, if the tag does not meet the predetermined criterion, varying the nonce by incrementing the nonce by a specific value and repeating a further iteration of the associating, the generating, and the checking with the varied nonce until the checking shows that the tag meets the predetermined criterion, wherein the predetermined criterion of the tag corresponds to a predetermined pattern of consecutive characters;

generating a first secret text by encrypting the specific data block of the message with the tag; and generating further secret texts depending on a remaining number of data blocks of the message by encrypting, using a symmetric block encryption method, respective remaining individual data blocks with a respectively corresponding tag, which is obtained by encrypting the specific data block and an incremented nonce with the secret key, wherein the incremented nonce comprises the nonce incremented by the specific value for each of the remaining number of data blocks; and sending the message, including the encrypted data blocks of the message, and the specific data block of the message generating the tag together with the nonce and the secret texts.

14. The method of claim 13, wherein the nonce has a constant character length.

15. A non-transitory computer-readable medium comprising a computer program comprising commands which, during an execution of the computer program by a computer, cause the computer to:
associate a first data block of a message with a first nonce, wherein the first data block of the message includes a hash value determined based on a preceding message;
generate a first tag by encrypting the first data block of the message associated with the first nonce using a secret key into the first tag;
check whether the first tag meets a predetermined criterion, including, if the first tag does not meet the predetermined criterion the commands causing the computer to: vary the first nonce by incrementing the first nonce by a specific value and repeat a further iteration of the associating, the generating, and the checking with the varied first nonce until the checking shows that the first tag meets the predetermined criterion, wherein the predetermined criterion of the first tag corresponds to a predetermined pattern of consecutive characters;
encrypt a second data block of the message using the first tag;
increment the first nonce by a first value to generate a second nonce,
wherein a character length of the second nonce is the same as a character length of the first nonce;
encrypt the first data block of the message associated with the second nonce using a symmetric block encryption method and the secret key to generate a second tag;
encrypt a third data block of the message using the second tag; and
transmit the message, including the encrypted first data block, the encrypted second data block, and the encrypted third data block, to a device to which the message is intended.

16. The non-transitory computer-readable medium of claim 15, wherein the first nonce is varied according to a condition.

17. The non-transitory computer-readable medium of claim 15, wherein the first data block of the message has a constant character length.

18. The non-transitory computer-readable medium of claim 15, wherein at least part of the first data block of the message further comprises a checksum of at least one additional part of at least one additional data block of the preceding message.

19. The non-transitory computer-readable medium of claim 15, wherein the secret key is a cryptographic secret key for a symmetric method.

20. The non-transitory computer-readable medium of claim 15, wherein the predetermined pattern of consecutive characters corresponds to a predetermined pattern of four consecutive characters.

* * * * *